United States Patent
Ye et al.

(10) Patent No.: US 7,226,689 B2
(45) Date of Patent: Jun. 5, 2007

(54) METHOD OF MAKING A MEMBRANE ELECTRODE ASSEMBLY FOR ELECTROCHEMICAL FUEL CELLS

(75) Inventors: Siyu Ye, Burnaby (CA); Paul Beattie, Port Moody (CA); Todd E Wilke, West Vancouver (CA); Shannon R Hodgson, Vancouver (CA); Kyoung Bai, Cranbrook (CA); Michael V Lauritzen, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 518 days.

(21) Appl. No.: 10/601,275

(22) Filed: Jun. 20, 2003

(65) Prior Publication Data

US 2004/0258979 A1     Dec. 23, 2004

(51) Int. Cl.
  *H01M 8/00*   (2006.01)
  *H01M 4/00*   (2006.01)

(52) U.S. Cl. ............................. 429/40; 429/12; 429/42

(58) Field of Classification Search .................. 429/13, 429/40, 42
See application file for complete search history.

(56) References Cited

U.S. PATENT DOCUMENTS

| 5,234,777 A | 8/1993 | Wilson ........................ 429/33 |
| 6,517,962 B1 | 2/2003 | Knights et al. ............... 429/13 |
| 6,977,234 B2 * | 12/2005 | Kosako et al. .............. 502/101 |
| 2003/0091891 A1 * | 5/2003 | Yoshida et al. ............... 429/44 |
| 2003/0108781 A1 * | 6/2003 | Oh et al. ....................... 429/13 |

FOREIGN PATENT DOCUMENTS

WO     WO 02/39526 A1     5/2002

* cited by examiner

*Primary Examiner*—Dah-Wei Yuan
(74) *Attorney, Agent, or Firm*—Seed IP Law Group PLLC

(57) ABSTRACT

A membrane electrode assembly may be made using a one-sided catalyst coated membrane (CCM) wherein only one catalyst layer, either the anode or the cathode, is coated directly on the ion-exchange membrane. In particular, a one-sided CCM may be used where it may not be practicable to coat both sides of the ion-exchange membrane with catalyst layers such as when PTFE is added to the anode catalyst layer to render it reversal tolerant.

10 Claims, 2 Drawing Sheets

METHOD OF MAKING A MEMBRANE ELECTRODE ASSEMBLY FOR ELECTROCHEMICAL FUEL CELLS

BACKGROUND OF THE INVENTION

1. Field of the Invention

The present invention relates to membrane electrode assembly structures for electrochemical fuel cells and more particularly to modifications to improve tolerance to voltage reversals.

2. Description of the Related Art

Fuel cell systems are currently being developed for use as power supplies in numerous applications, such as automobiles and stationary power plants. Such systems offer promise of economically delivering power with environmental and other benefits. To be commercially viable however, fuel cell systems need to exhibit adequate reliability in operation, even when the fuel cells are subjected to conditions outside the preferred operating range.

Fuel cells convert reactants, namely fuel and oxidant, to generate electric power and reaction products. Fuel cells generally employ an electrolyte disposed between two electrodes namely a cathode and an anode. A catalyst typically induces the desired electrochemical reactions at the electrodes. Preferred fuel cell types include polymer electrolyte membrane (PEM) fuel cells that comprise a polymer membrane as electrolyte and operate at relatively low temperatures.

A broad range of reactants can be used in PEM fuel cells. For example, the fuel stream may be substantially pure hydrogen gas, a gaseous hydrogen-containing reformate stream, or methanol in a direct methanol fuel cell. The oxidant can be, for example, substantially pure oxygen or a dilute oxygen stream such as air.

During normal operation of a PEM fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

Polymer electrolyte membrane (PEM) fuel cells employ a membrane electrode assembly (MEA) which comprises an ion-exchange membrane disposed between the two electrodes. Separator plates, or flow field plates for directing the reactants across one surface of each electrode substrate, are disposed on each side of the MEA.

Each electrode contains a catalyst layer, comprising an appropriate catalyst or an admixture of appropriate catalysts, which is located next to the ion-exchange membrane. The catalyst may be a metal black, an alloy, an unsupported or supported metal catalyst. A commonly used catalyst is, for example, platinum supported on carbon. The catalyst layer typically contains ionomer, which may be similar to that used for the ion-exchange membrane (for example, up to 30% by weight Nafion® brand perfluorosulfonic-based ionomer). The catalyst layer may also contain a binder such as polytetrafluoroethylene.

The electrodes may also contain a substrate (typically a porous electrically conductive sheet material) that may be employed for purposes of reactant distribution and/or mechanical support. Optionally, the electrodes may also contain a sublayer (typically containing an electrically conductive particulate material, for example, finely comminuted carbon particles, also known as carbon black) between the catalyst layer and the substrate. A sublayer may be used to modify certain properties of the electrode (for example, interface resistance between the catalyst layer and the substrate).

Electrocatalyst can be incorporated at the electrode/membrane interface in polymer electrolyte fuel cells by applying it as a layer on either an electrode substrate or on the membrane itself. In the former case, electrocatalyst particles are typically mixed with a liquid to form a slurry or ink which is then applied to the electrode substrate. While the slurry preferably wets the substrate surface to a certain extent, the slurry may penetrate into the substrate such that it is no longer catalytically useful since the reaction zone is generally only close to the ion-exchange membrane. Comparatively lower catalyst loadings can thus typically be achieved by coating the ion-exchange membrane with a catalyst layer while still maintaining performance. In addition to waste of catalyst material, a thicker electrocatalyst layer as typically coated on electrode substrates may also lead to increased mass transport losses.

Typical methods of preparing a catalyst coated membrane (CCM) also start with the preparation of a slurry. A slurry typically comprises a carbon-supported catalyst, the polymer matrix/binder and a suitable liquid vehicle such as, for example water, methanol or isopropanol. The slurry is then either directly applied onto the membrane by, for example screen printing, or applied onto a separate carrier or release film from which, after drying, it is subsequently transferred onto the membrane using heat and pressure in a decal process. Alternatively, the CCM may be made by other known methods such as vapor deposition, casting or extrusion.

Efficiency of the MEA in the fuel cell is typically affected by the quality of the contact between the catalyst layer and the ion-exchange membrane. When the quality of such a contact is relatively poor, partial or complete delamination of the MEA may result over time. CCMs typically have a better contact between catalyst layer and ion-exchange membrane as compared with GDEs bonded to an ion-exchange membrane, particularly with low catalyst loadings such as, for example, less than 0.3 mg/cm$^2$ of platinum catalyst. It may be difficult to prepare a suitable GDE with such low catalyst loadings.

However, there may also be indirect costs associated with coating catalyst layers on ion-exchange membranes. Both the catalyst and the ion-exchange membrane are relatively expensive components found in a typical PEM fuel cell, particularly as compared to gas diffusion layers. Errors in coating a catalyst layer on an ion-exchange membrane may result in the entire CCM being rejected.

While CCM techniques typically result in an interface with higher connectivity or contiguity between the catalyst and the ion-exchange membrane and thus better performance in the corresponding fuel cell, improvements are still needed in over-all fuel cell performance and durability.

BRIEF SUMMARY OF THE INVENTION

In some applications it may not be practicable to prepare a CCM where both sides of an ion-exchange membrane are coated with catalyst compositions due to specific requirements of only one of the anode or cathode catalyst layers. In such a situation, a one-sided CCM where a catalyst layer is coated on only one side of the ion-exchange membrane may be prepared and used in the manufacture of a membrane electrode assembly. For example, the membrane electrode assembly may be made by:

(a) providing a first gas diffusion layer;
(b) providing a one-sided catalyst coated membrane having a first catalyst layer coated on an ion-exchange membrane;
(c) providing a gas diffusion electrode having a second catalyst layer coated on a second gas diffusion layer;
(d) bonding the first gas diffusion layer to the one-sided catalyst coated membrane such that the first catalyst layer is interposed between the first gas diffusion layer and the ion-exchange membrane; and
(e) bonding the gas diffusion electrode to the one-sided catalyst coated membrane such that the second catalyst layer is interposed between the second gas diffusion layer and the ion-exchange membrane.

Both bonding steps may occur simultaneously or consecutively.

In an embodiment, the first catalyst layer is the cathode catalyst layer coated on the ion-exchange membrane and the second catalyst layer is the anode catalyst layer, coated on a gas diffusion layer, contains a porosity-reducing additive such as polytetrafluoroethylene (PTFE). By adding PTFE, in an amount between 5% and 32% by weight, more particularly between 10% and 29% by weight, and even more particularly about 12%, the anode may be made reversal tolerant. The porosity-reducing additive may also contain acetylene carbon black.

In providing the gas diffusion electrode, the anode catalyst layer may be coated on one side of a gas diffusion layer and then sintered to heat stabilize the PTFE in the catalyst layer. Sintering may be, for example, at a temperature between 330 and 420° C. To improve contact between the gas diffusion electrode and the ion-exchange membrane, an ionomer solution may be applied to the surface of the catalyst layer after the sintering step.

These and other aspects of the invention will be evident upon reference to the attached figures and following detailed description.

DETAILED DESCRIPTION OF THE INVENTION

Figure 1:
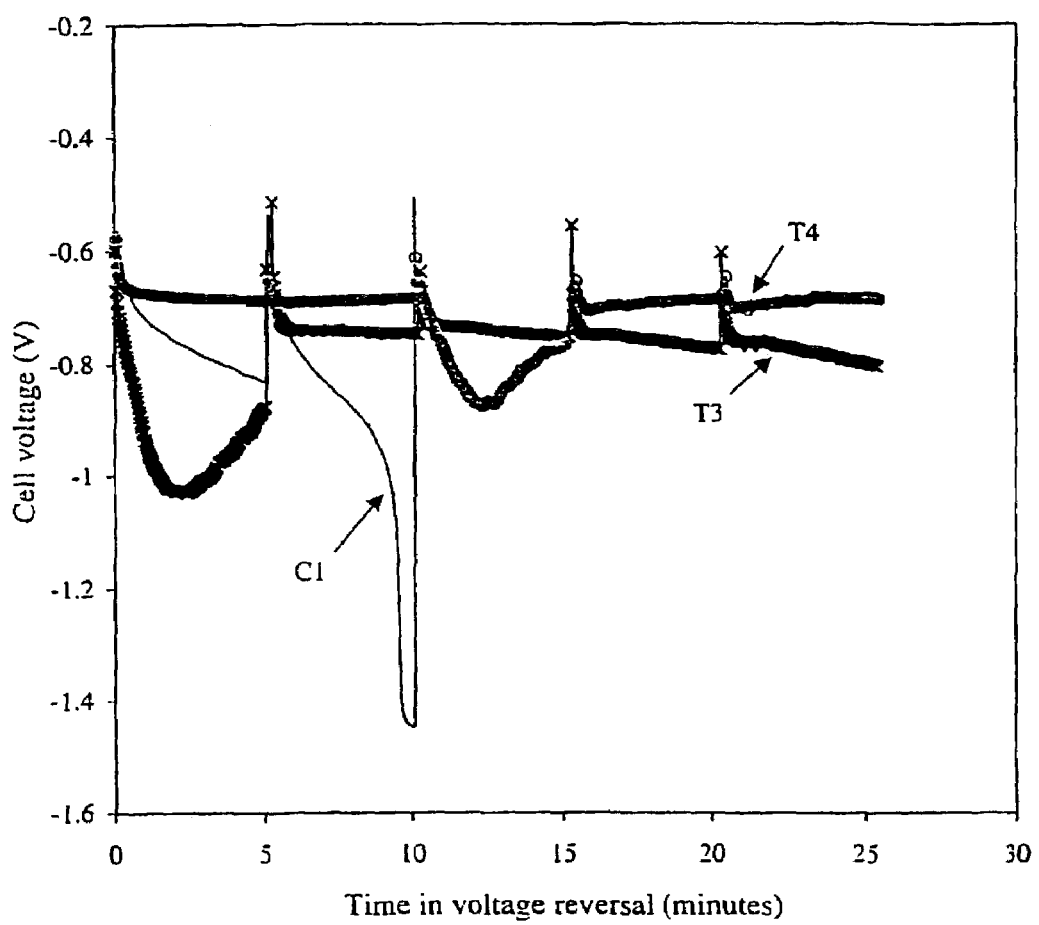
FIG. 1 is a plot of voltage as a function of time in reversal for comparison cell C1 and modified anode test cells T3 and T4.

In operation, the output voltage of an individual fuel cell under load is generally below one volt. Therefore, in order to provide greater output voltage, numerous cells are usually stacked together and are connected in series to create a higher voltage fuel cell stack. End plate assemblies are placed at each end of the stack to hold it together and to compress the stack components together. Compressive force effects adequate sealing and makes adequate electrical contact between various stack components. Fuel cell stacks can then be further connected in series and/or parallel combinations to form larger arrays for delivering higher voltages and/or currents.

Electrochemical cells are occasionally subjected to a voltage reversal condition, which is a situation where the cell is forced to the opposite polarity. This can be deliberate, as in the case of certain electrochemical devices known as regenerative fuel cells. Regenerative fuel cells are constructed to operate both as fuel cells and as electrolyzers in order to produce a supply of reactants for fuel cell operation. Such devices have the capability of directing a water fluid stream to an electrode where, upon passage of an electric current, oxygen is formed. Hydrogen is formed at the other electrode. However, power-producing electrochemical fuel cells in series are potentially subjected to unwanted voltage reversals, such as when one of the cells is forced to the opposite polarity by the other cells in the series. In the fuel cell stacks, this can occur when an individual cell experiences fuel starvation, and is thus unable to sustain the hydrogen oxidation/oxygen reduction reactions. The net result is that the current may still be forced through the cell by the rest of the cells in the stack resulting in damage to the anode electrode structure and ultimately resulting in MEA failure. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions can occur, which can detrimentally affect fuel cell components. Component degradation reduces the durability and performance of the fuel cell, and in turn, its associated stack and array. In particular, the following reactions may occur at the anode during a voltage reversal:

$$H_2O \rightarrow \tfrac{1}{2}O_2 + 2H^+ + 2e^- \quad (1)$$

$$\tfrac{1}{2}C + H_2O \rightarrow \tfrac{1}{2}CO_2 + 2H^+ + 2e^- \quad (2)$$

Thermodynamically, oxidation of the carbon components starts to occur before electrolysis. However, it has been found that electrolysis appears kinetically preferred and thus proceeds at a greater rate.

U.S. Pat. No. 6,517,962 (the '962 patent, herein incorporated by reference in its entirety) discusses the problem of voltage reversals and makes the fuel cell more tolerant to voltage reversal by facilitating water electrolysis at the anode during reversal. This is done by making water more available at the anode. In particular, the presence of water at the anode catalyst can be enhanced by restricting passage of water through the anode structure, by for example, adding a hydrophobic additive such as polytetrafluoroethylene to the catalyst layer. This benefit is shown experimentally in FIG. 5 in the '962 patent, reproduced as FIG. 1 herein.

FIG. 1 shows the voltage versus time in reversal for comparison cell C1 and modified anode test cells T3 and T4. Cell T3 employed 6% by weight hydrophobic PTFE with no loading of ionomer in the catalyst layer whereas cell T4 employed 6% by weight PTFE with 30% by weight loading of Nafion® in the catalyst layer. These were bonded to a conventional cathode having carbon supported platinum catalyst applied to a porous carbon fibre paper substrate (TGP-090 grade from Toray) and a conventional Nafion® ion-exchange membrane. The anodes employed a conventional carbon-supported platinum-ruthenium catalyst applied to a porous carbon fibre paper substrate (TGP-090 grade from Toray).

Three different amounts of PTFE (12, 24 and 36% by weight of the catalyst layer) were subsequently used in combinations with three different amounts of acetylene carbon black added, namely Shawinigan black (0, 0.15 and 0.3 mg/cm²). From this analysis, particularly beneficial amounts of PTFE and Shawinigan black in the anode catalyst layer for voltage reversal were found between 6 and 32% PTFE, more particularly between 12 and 29% PTFE, and 0.03 and 0.2 mg/cm² Shawinigan black.

In the '962 patent, the MEA was prepared by laminating together two gas diffusion electrodes (GDEs) to an ion-exchange membrane. Preparing a similar MEA through preparation of a catalyst coated membrane prior to lamination with two gas diffusion layers (GDLs) may not be practicable. The high temperatures involved in heat treatment stabilization (sintering) of the PTFE in the anode catalyst layer may degrade the ion-exchange membrane. In comparison, sintering of a catalyst layer containing PTFE in a GDE typically would not adversely affect the underlying GDL.

In particular, sintering of the PTFE in the catalyst layer may be for between 5 and 15 minutes and at temperatures between about 330° C. and about 420° C. Following stabilization, the anode catalyst layer may be sprayed with an ionomer solution to enhance contact between the anode and the ion-exchange membrane during bonding. Consequently, it would not be practicable to use such a reversal tolerant layer in a CCM.

Figure 2:
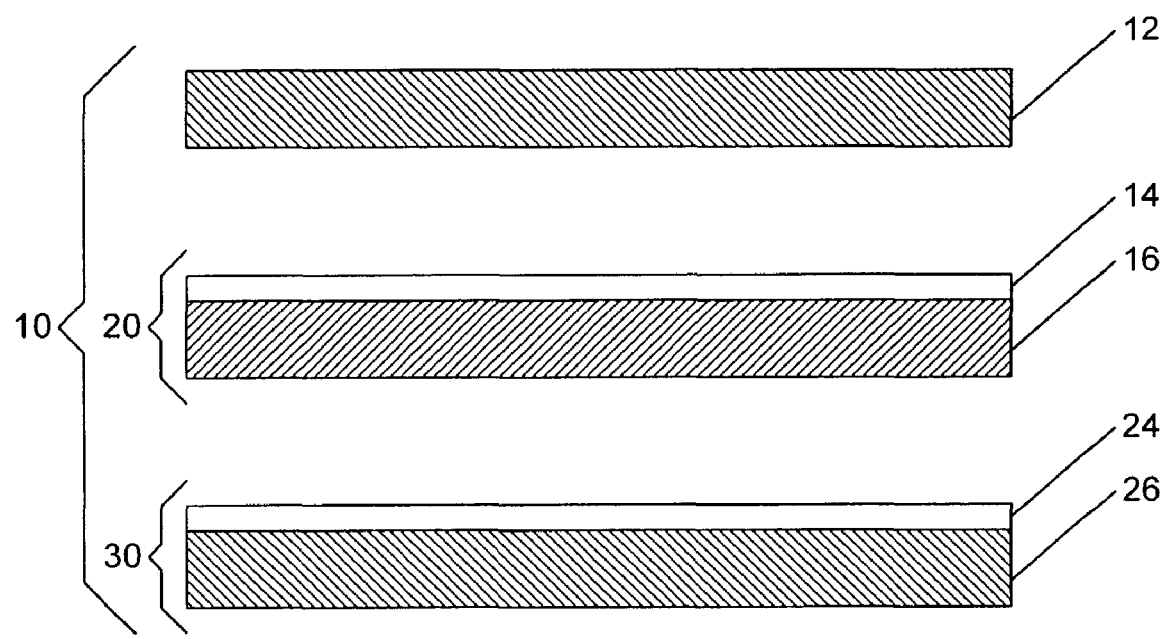
FIG. 2 is a schematic diagram of an exploded membrane electrode assembly.

An improved MEA may be prepared from the elements as illustrated in FIG. 2. FIG. 2 shows an exploded MEA 10 comprising a cathode GDL 12, a cathode catalyst layer 14 coated on an ion-exchange membrane 16 (together forming a one-sided catalyst coated membrane 20), an anode catalyst layer 24 coated on an anode GDL 26 (together forming an anode GDE 30). Cathode GDL 12, one-sided CCM 20 and GDE 30 may be bonded together to form MEA 10. Bonding conditions may vary according to the glass transition temperature of ion-exchange membrane 16 and surface roughness of GDL 12, 26 as known to someone skilled in the art. Nevertheless, typical bonding may be done by applying temperature and/or pressure such as, for example, between 130 and 170° C. and 5 and 25 bar for between 30 seconds and 5 minutes.

By using a one-sided CCM, an MEA may be prepared that has the advantages of improved contact, at least on one side of the membrane, in systems where it is not practicable to coat the other catalyst layer on the membrane. For example, if anode catalyst layer 24 contains PTFE to render it reversal tolerant such that it is not practicable to be coated directly on ion-exchange membrane 16, improved catalyst-membrane contact may still be achieved with the cathode catalyst layer 14 as shown in FIG. 2. Further, additional reject costs may be avoided by coating catalyst layer 24 on GDL 26 which is relatively inexpensive as compared to ion-exchange membrane 16. While yet further reject costs would also be seen if catalyst layer 14 were coated on GDL 12, the embodiment illustrated in FIG. 2 provides a balance between improved catalyst-membrane interactions and reduced cost. This additional advantage is independent of the nature of the catalyst layer on ion-exchange membrane 16. In other words, catalyst layer 14 may be the cathode catalyst layer as illustrated in FIG. 2 or catalyst layer 14 could be the anode catalyst layer.

In an embodiment, anode catalyst layer 24 may comprise catalyst particles such as, for example, 40% Pt/20% Ru supported on Shawinigan black in addition to the PTFE. An additional catalyst composition such as unsupported RuO2/IrO2 with an atomic ratio of 90/10 may optionally be present. An ionomer spray coat (not shown) may be applied to the surface of anode catalyst layer 24 after sintering of the PTFE to improve contact between the catalyst layer and the ion-exchange membrane. In particular, the ionomer in the ionomer spray coat may be the same as in the ion-exchange membrane. For example, particular benefits may be observed if a Nafion® spray coat is used with a Nafion® ion-exchange membrane. Similarly, a second ionomer spray coat may be applied at the interface between cathode catalyst layer 14 and gas diffusion layer 12 to facilitate effective adhesion of the components during bonding. In particular, this second ionomer spray coat may be applied to gas diffusion layer 12 to allow effective bonding at lower temperatures and pressures. The ionomer spray coats may also contain a carbon such as carbon black, graphite, carbon nanotubes, meso carbon microbeads, etc.

The presence of reversal tolerant anode catalyst layer 24 may thus allow MEA 10 to be tolerant to sustained or repeated transient reversals without incurring significant performance losses. Improved performance of MEA 10 may also be observed due to improved contact between cathode catalyst layer 14 and ion-exchange membrane 16, even at low catalyst loadings.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of making a membrane electrode assembly for an electrochemical fuel cell comprising:
   providing a first gas diffusion layer;
   providing a one-sided catalyst coated membrane having a first catalyst layer coated on an ion-exchange membrane;
   providing a gas diffusion electrode having a sintered catalyst layer coated on a second gas diffusion layer, wherein the sintered catalyst layer is the anode catalyst layer and wherein sintering of the anode catalyst layer is at a temperature between about 330° C. and 420° C.;
   bonding the first gas diffusion layer to the one-sided catalyst coated membrane such that the first catalyst layer is interposed between the first gas diffusion layer and the ion-exchange membrane; and
   bonding the gas diffusion electrode to the one-sided catalyst coated membrane such that the sintered catalyst layer is interposed between the second gas diffusion layer and the ion-exchange membrane.

2. The method of claim 1 wherein both bonding steps occur simultaneously.

3. The method of claim 1 further comprising applying an ionomer solution to the surface of the sintered catalyst layer before the step of bonding the gas diffusion electrode.

4. The method of claim 1 wherein the anode catalyst layer comprises a porosity-reducing additive.

5. The method of claim 4 wherein the porosity-reducing additive comprises polytetrafluoroethylene.

6. The method of claim 5 wherein the anode catalyst composition comprises between 5% and 32% by weight polytetrafluoroethylene.

7. The method of claim 5 wherein the anode catalyst composition comprises between 10% and 29% polytetrafluoroethylene.

8. The method of claim 5 wherein the porosity-reducing additive further comprises acetylene carbon black.

9. The method of claim 1 wherein the step of providing the gas diffusion electrode comprises coating the anode catalyst layer on one side of the second gas diffusion layer and then sintering the catalyst coated gas diffusion layer to yield the sintered catalyst layer coated on the second gas diffusion layer.

10. The method of claim 9 wherein the step of providing the gas diffusion electrode further comprises applying an ionomer solution to the surface of the anode catalyst layer after sintering.

* * * * *